US011953188B1

(12) United States Patent
Colby

(10) Patent No.: US 11,953,188 B1
(45) Date of Patent: Apr. 9, 2024

(54) LED BULB INCLUDING DIGITAL SIGNAL PROCESSOR

(71) Applicant: Steven Michael Colby, Verdi, NV (US)

(72) Inventor: Steven Michael Colby, Verdi, NV (US)

( * ) Notice: Subject to any disclaimer, the term of this patent is extended or adjusted under 35 U.S.C. 154(b) by 160 days.

(21) Appl. No.: 17/735,849

(22) Filed: May 3, 2022

Related U.S. Application Data

(63) Continuation of application No. 17/239,631, filed on Apr. 25, 2021, now Pat. No. 11,320,129, which is a continuation of application No. 15/647,225, filed on Jul. 11, 2017, now Pat. No. 10,989,367, which is a continuation of application No. 14/466,682, filed on Aug. 22, 2014, now Pat. No. 9,702,514, and a continuation of application No. 13/846,893, filed on Mar. 18, 2013, now Pat. No. 9,897,275, and a continuation of application No. 13/742,087, filed on Jan. 15, 2013, now Pat. No. 9,874,332, said application No. 14/466,682 is a continuation-in-part of application No. 12/623,269, filed on Nov. 20, (Continued)

(51) Int. Cl.

| | |
|---|---|
| ***F21V 23/04*** | (2006.01) |
| ***F21K 9/23*** | (2016.01) |
| ***F21K 9/232*** | (2016.01) |
| ***F21K 9/235*** | (2016.01) |
| ***F21K 9/65*** | (2016.01) |
| ***F21K 9/68*** | (2016.01) |
| ***F21S 10/00*** | (2006.01) |
| ***F21S 10/06*** | (2006.01) |
| ***F21V 19/04*** | (2006.01) |
| ***H05B 45/00*** | (2022.01) |
| *F21Y 101/00* | (2016.01) |
| *F21Y 115/10* | (2016.01) |

(52) U.S. Cl.
CPC ................ *F21V 23/04* (2013.01); *F21K 9/23* (2016.08); *F21K 9/232* (2016.08); *F21K 9/235* (2016.08); *F21K 9/65* (2016.08); *F21K 9/68* (2016.08); *F21S 10/002* (2013.01); *F21S 10/005* (2013.01); *F21S 10/06* (2013.01); *F21V 19/047* (2013.01); *H05B 45/00* (2020.01); *F21Y 2101/00* (2013.01); *F21Y 2115/10* (2016.08)

(58) Field of Classification Search
CPC ... F21K 9/68; F21K 9/65; F21K 9/232; F21K 9/235; F21S 10/06; F21S 10/002; F21S 10/005; F21V 19/047; F21V 23/04; F21Y 2115/10; F21Y 2101/00; H05B 33/0803
See application file for complete search history.

(56) References Cited

U.S. PATENT DOCUMENTS

| | | | |
|---|---|---|---|
| 4,358,710 | A | 11/1982 | Magai |
| 4,500,821 | A | 2/1985 | Bitting et al. |

(Continued)

FOREIGN PATENT DOCUMENTS

| | | | |
|---|---|---|---|
| WO | 2005/003625 | A1 | 1/2005 |

*Primary Examiner* — Kevin Quarterman
(74) *Attorney, Agent, or Firm* — Rimon Law P.C

(57) ABSTRACT

A bulb including light emitting diodes is optionally used to achieve a variety of light output colors and/or intensities. In some embodiments, the inputs to a three-way bulb are configured to perform other functions, such as power a motor. In some embodiments, a bulb including light emitting diodes includes a replicable cover and/or a replicable LED. This cover may be configured to project images or support a shade made of a heat sensitive material. The bulb may include a digital signal processor and/or a timer.

20 Claims, 16 Drawing Sheets

Related U.S. Application Data

2009, which is a continuation-in-part of application No. 11/244,641, filed on Oct. 5, 2005, now Pat. No. 7,748,877.

(60) Provisional application No. 60/616,361, filed on Oct. 5, 2004.

(56) References Cited

U.S. PATENT DOCUMENTS

| | | | |
|---|---|---|---|
| 4,675,575 | A | 6/1987 | Smith et al. |
| 4,816,977 | A | 3/1989 | Sorensen |
| 4,847,739 | A | 7/1989 | Saraceni |
| 4,858,083 | A | 8/1989 | Wakimoto |
| 4,897,771 | A | 1/1990 | Parker |
| 4,939,426 | A | 7/1990 | Menard et al. |
| 5,067,060 | A | 11/1991 | Sieracki |
| 5,155,669 | A | 10/1992 | Yamuro |
| 5,504,666 | A | 4/1996 | Carmichael |
| 5,831,436 | A | 11/1998 | Borland |
| 5,936,599 | A | 8/1999 | Reymond |
| 6,210,015 | B1 | 4/2001 | Ross |
| 6,276,822 | B1 | 8/2001 | Bedrosian et al. |
| 6,400,104 | B1 | 6/2002 | Ham |
| 6,416,198 | B1 | 7/2002 | Vanderschuit |
| 6,499,860 | B2 | 12/2002 | Begemann |
| 6,580,228 | B1 | 6/2003 | Chen et al. |
| 6,700,333 | B1 | 3/2004 | Hirshi et al. |
| 6,729,740 | B1 | 5/2004 | Gazard |
| 7,045,965 | B2 | 5/2006 | Li et al. |
| 7,118,242 | B1 | 10/2006 | Yulee |
| 7,264,381 | B2 | 9/2007 | Liu et al. |
| 7,346,061 | B2 | 3/2008 | Takayama et al. |
| 7,658,510 | B2 | 2/2010 | Russell |
| 2002/0047646 | A1 | 4/2002 | Lys et al. |
| 2002/0070688 | A1 | 6/2002 | Dowling et al. |
| 2002/0085387 | A1 | 7/2002 | Taniuchi |
| 2002/0085392 | A1 | 7/2002 | Hajianpour |
| 2002/0101164 | A1 | 8/2002 | Yan |
| 2002/0105808 | A1 | 8/2002 | Ting Yup |
| 2002/0109448 | A1 | 8/2002 | Al-Refai |
| 2002/0110000 | A1 | 8/2002 | Marcus |
| 2002/0171377 | A1 | 11/2002 | Mueller et al. |
| 2002/0186557 | A1 | 12/2002 | Lary et al. |
| 2002/0191403 | A1 | 12/2002 | Zhang et al. |
| 2003/0040200 | A1 | 2/2003 | Cao |
| 2003/0147235 | A1 | 8/2003 | Lin et al. |
| 2003/0214259 | A9 | 11/2003 | Dowling et al. |
| 2003/0214810 | A1 | 11/2003 | Zhang |
| 2003/0222558 | A1 | 12/2003 | Cok |
| 2003/0222578 | A1 | 12/2003 | Cok |
| 2003/0235055 | A1 | 12/2003 | Lodhie |
| 2004/0051474 | A1 | 3/2004 | Wong |
| 2004/0070519 | A1 | 4/2004 | Wu et al. |
| 2004/0085764 | A1 | 5/2004 | Martin et al. |
| 2004/0095748 | A1 | 5/2004 | Lin |
| 2004/0095781 | A1 | 5/2004 | Lo |
| 2004/0174651 | A1 | 9/2004 | Aisenbrey |
| 2004/0264187 | A1 | 12/2004 | Vanderschuit |
| 2005/0018147 | A1 | 1/2005 | Lee et al. |
| 2005/0052885 | A1 | 3/2005 | Wu |
| 2005/0093427 | A1 | 5/2005 | Wang et al. |
| 2005/0116597 | A1 | 6/2005 | Hsu |
| 2005/0128751 | A1 | 6/2005 | Roberge et al. |
| 2005/0200314 | A1 | 9/2005 | Vakil et al. |
| 2005/0201081 | A1 | 9/2005 | Brady |
| 2006/0133079 | A1 | 6/2006 | Callahan |
| 2008/0113541 | A1 | 5/2008 | Adams |
| 2011/0189894 | A1 | 8/2011 | Hirsh et al. |
| 2011/0234082 | A1 | 9/2011 | Cao |

LED BULB INCLUDING DIGITAL SIGNAL PROCESSOR

CROSS-REFERENCE TO RELATED APPLICATIONS

This application is a continuation of U.S. patent application Ser. No. 17/239,631 filed Apr. 25, 2021, which in turn is a continuation of U.S. patent application Ser. No. 15/647,225 filed Jul. 11, 2017 now U.S. Pat. No. 10,989,367 issued Apr. 27, 2021, which in turn a continuation of U.S. patent application Ser. No. 14/466,682 filled Aug. 22, 2014 now U.S. Pat. No. 9,702,514 issued on Jul. 11, 2017, which is a continuation-in-part of U.S. patent application Ser. No. 12/623,269 filed Nov. 20, 2009 now U.S. Pat. No. 8,911,119 issued Dec. 16, 2014, which in turn is a continuation-in-part of U.S. patent application Ser. No. 11/244,641 filed Oct. 5, 2005 now U.S. Pat. No. 7,748,877 issued Jul. 6, 2010, which in turn claims priority and benefit of U.S. Provisional Patent Application Ser. No. 60/616,361, filed Oct. 5, 2004; U.S. patent application Ser. No. 15/647,225 is a continuation of U.S. patent application Ser. No. 13/846,893 filed Mar. 18, 2013 now U.S. Pat. No. 9,897,275 issued Feb. 20, 2018; U.S. patent application Ser. No. 15/647,225 is a continuation of U.S. patent application Ser. No. 13/742,087 filed Jan. 15, 2013 now U.S. Pat. No. 9,874,332 issued Jan. 23, 2018. All of the above patent applications are hereby incorporated herein by reference.

BACKGROUND

Field of the Invention

The invention is in the field of lighting and more specifically in the fields of colored lighting and variable intensity lighting.

Related Art

The art includes three-way bulbs configured to operate in lighting fixtures configured to power these three-way bulbs. See for example, U.S. Pat. No. 486,334 to Hall et al. These legacy lighting fixtures include a 3-way receptacle configured to receive a base of the three-way bulb. The receptacle typically includes two hot contacts and a neutral contact configured to form circuits when a three-way bulb is placed in the 3-way receptacle. The base includes contacts configured to come in contact with the two hot contacts and a neutral contact of the base when the base is screwed into the receptacle. The legacy lighting fixture further includes a three-way power switch to alternatively power the hot contacts. In operation the three-way switch alternatively powers the hot contacts such that the bulb is lit at three different output intensities.

FIG. 1 illustrates a Three-Way Bulb 100 of the prior art. Three-Way Bulb 100 of the prior art includes a Glass Cover 110 and a Base 120 configured to fit within a three-way bulb socket of the prior art.

FIG. 2 illustrates the three-way bulb of FIG. 1 with the glass cover removed. This view shows a First Filament 200 and a Second Filament 210. First Filament 200 and Second Filament 210 are supported by Leads 230A-230C.

FIG. 3 illustrates further detail of Base 120 of Three-Way Bulb 100. Base 120 includes three electrical contact elements. The three electrical contact elements include a neutral outer Contact Surface 310 often configured for screwing Three-Way Bulb 100 into a receptacle, a First Hot Contact 320 and a Second Hot Contact 330. When First Hot Contact 320 is powered (e.g. a voltage is applied relative to Contact Surface 310) First Filament 200 is lit. When Second Hot Contact 330 is powered Second Filament 210 is lit. When Both First Hot Contact 320 and Second Hot Contact 330 are powered, both First Filament 150 and Second Filament 160 are lit.

FIG. 4 illustrates a legacy Three-Way Receptacle 410 and Three-Way Switch 415 configured to accommodate Three-Way Bulb 100. Three-Way Receptacle 410 is characterized by including at least three contacts configured to make electrical connection to Contact Surface 310, First Hot Contact 320 and Second Hot Contact 330 of Three-Way Bulb 100. For example, FIG. 4 shows an instance of Three-Way Receptacle 410 including an Outer Contact 420, a Middle Contact 430, and a Center Contact 440. Often, Three-Way Receptacle 410 is further characterized by screw Threads 450 included in Outer Contact 420 and configured to receive Three-Way Bulb 100.

Switch 210 is configured to alternatively power First Hot Contact 130, Second Hot Contact 140, or both First Hot Contact 130 and Second Hot Contact 140. Various configurations of Switch 210 are known in the art. See for example, U.S. Pat. No. 551,357 to Beal or U.S. Pat. No. 712,149 to Paiste.

LEDs (light emitting diodes) are now available to that generate different colors of light. For example, white, red, yellow, green, and blue. These LEDs are of two general types. First, an LED that generates a fixed color (e.g., white or red or yellow). A variety of colors may be generated using more than one of these single color LEDs by powering them several at a time such that their outputs mix to produce a net light output. And Second, a multi-color LED that alone can generate more than one color responsive to voltages applied at different inputs to the multi-color LED.

FIG. 5 illustrates schematically several types of prior art LEDs 510.

The ability to generate light of different color is an advantage of the above LEDs. However, these LEDs require special fixtures. There is a need for improved systems and methods of using these LEDs that are more convenient and practical to consumers.

SUMMARY OF THE INVENTION

Various embodiments of the invention includes a multi-mode bulb having one or more LEDs. The multi-mode bulb is configured to operate in a three-way receptacle of a legacy lighting fixture, and further configured to generate different colors and/or different intensities responsive to a three-way switch of the legacy lighting fixture. In some embodiments, the bulb includes a plurality of LEDs each configured to generate a different color of light. In these embodiments, different LEDs are powered responsive to settings of the three-way switch. The multi-mode bulb may be made to produce light of various colors by powering alternative LEDs and/or combinations of LEDs. In some embodiments the multi-mode bulb includes one or more multi-color LED configured to each generate more than one color. In these embodiments the bulb may be made to generate light of different colors by applying voltage to various inputs of the multi-color LED. The three-way switch may be used to apply these voltages to the inputs. In some embodiments, the bulb includes a plurality of LEDs configured to generate light of the same color. The intensity of total light produced by the multi-mode bulb may be varied by powering various alternative members and/or combinations of this plurality of LEDs. In some embodiments, the three-way switch is used to vary both intensity and color of light generated by the multi-mode bulb.

Various embodiments of the invention include a bulb having a standard bulb shape but including a plastic or polymer cover rather than a glass cover.

Various embodiments of the invention include a bulb having a replaceable cover. The replaceable glass cover is optionally of various materials, various colors or various other optical properties.

Various embodiments of the invention include a cover for a bulb. In various embodiments the cover being of different colors, having areas of varying light transmission, or having various fillers.

BRIEF DESCRIPTION OF THE VARIOUS VIEWS OF THE DRAWINGS

DETAILED DESCRIPTION

Figure 4:
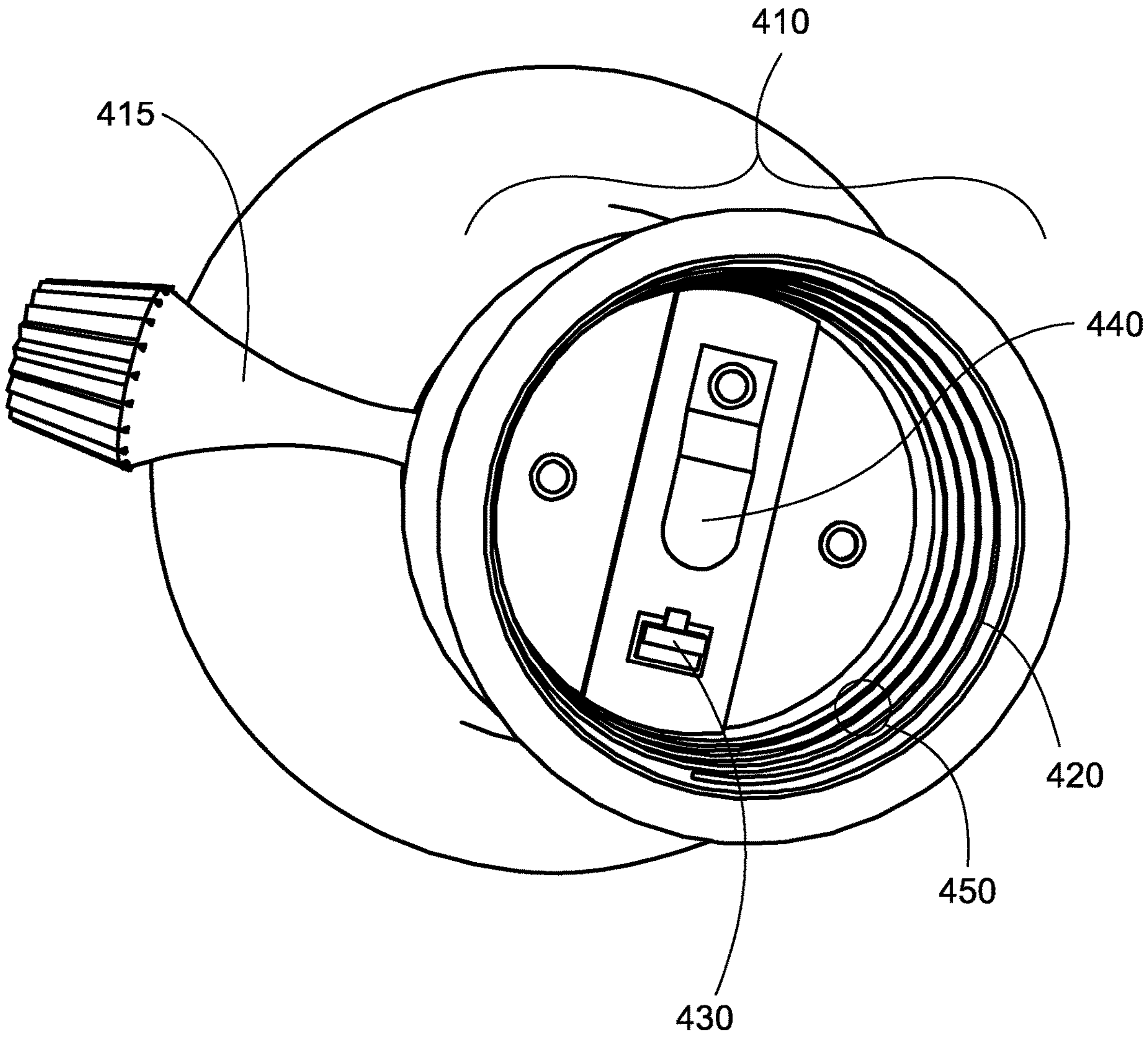
FIG. 4 PRIOR ART
FIG. 4 illustrates a legacy three-way receptacle 410 and three-way switch.
Figure 5:
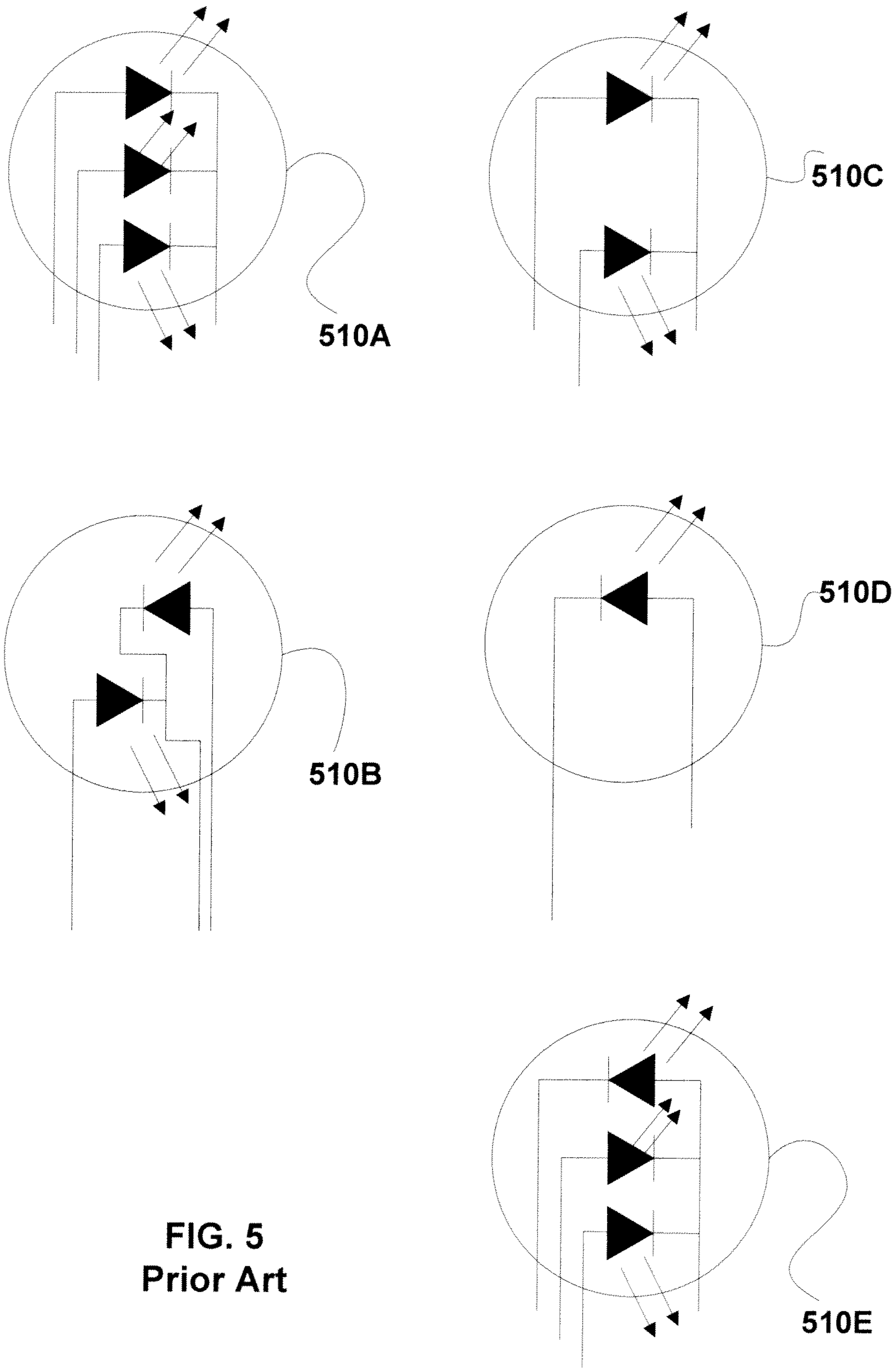
FIG. 5 Prior Art
FIG. 5 illustrates schematically several types of prior art LEDs 510.

Various embodiments of the invention include a multi-mode bulb configured to generate light of two or three different colors, and/or two or three different intensities, responsive to a legacy three-way switch such as that shown in FIG. 4. The multi-mode bulb includes at least three electrical contacts and typically is configured to screw into a legacy three-way receptacle such as that illustrated in FIG. 4.

Figure 6A:
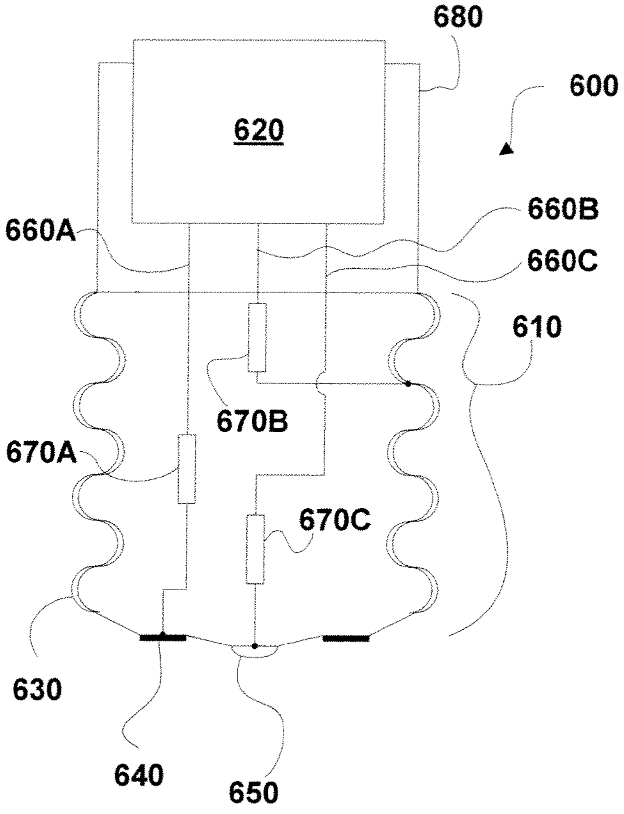
FIG. 6A and FIG. 6B illustrate two examples of a multi-mode bulb, according to various embodiments of the invention.
Figure 6B:
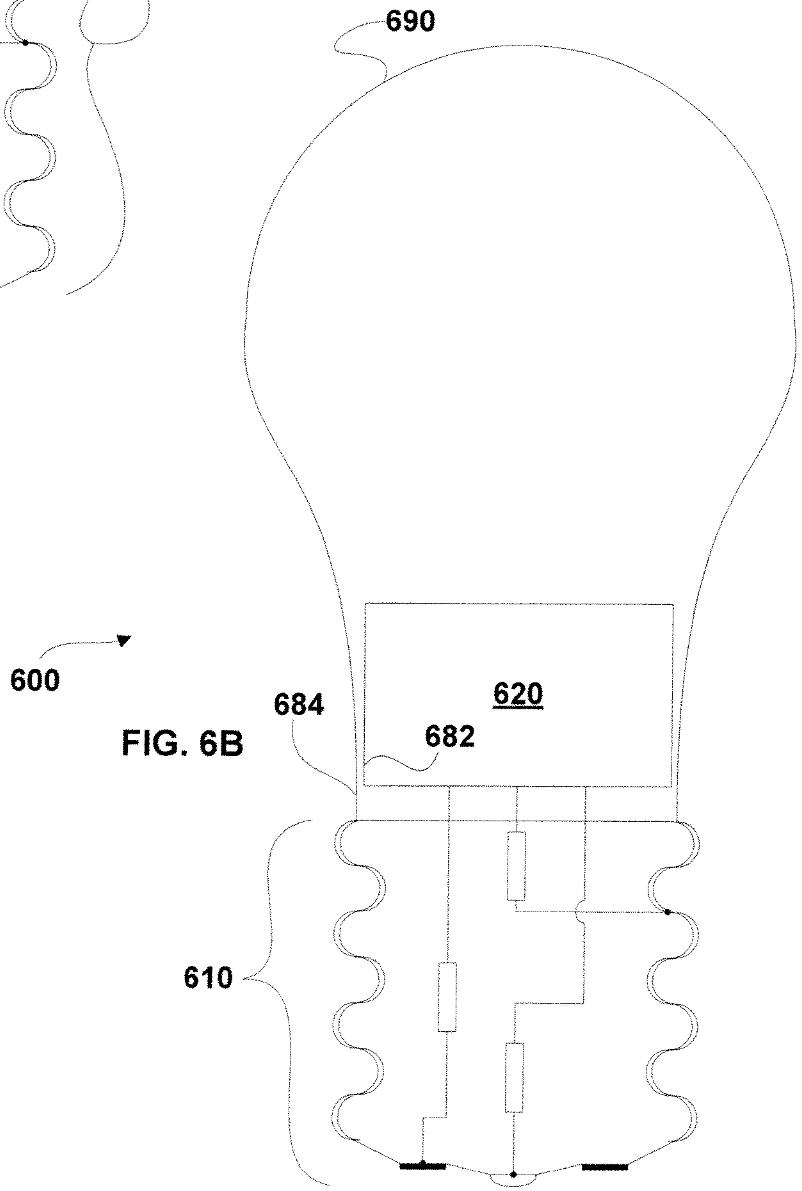

FIG. 6A and FIG. 6B illustrate two examples of a Multi-Mode Bulb, generally designated 600, according to various embodiments of the invention. Multi-Mode Bulb 600 includes at least a Base 610 and a Light Source 620.

Figure 1:
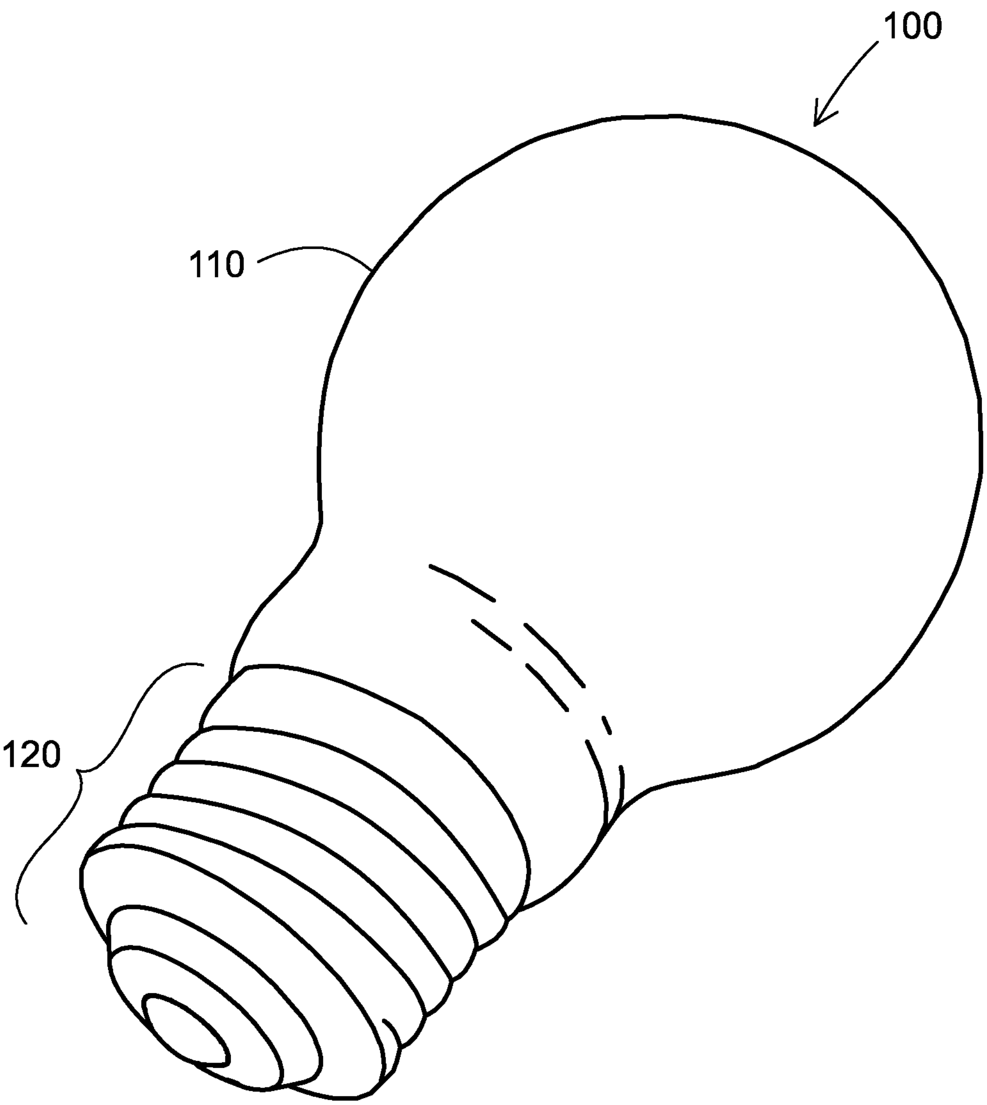
FIG. 1 PRIOR ART
FIG. 1 illustrates a Three-Way Bulb 100 of the prior art.
Figure 2:
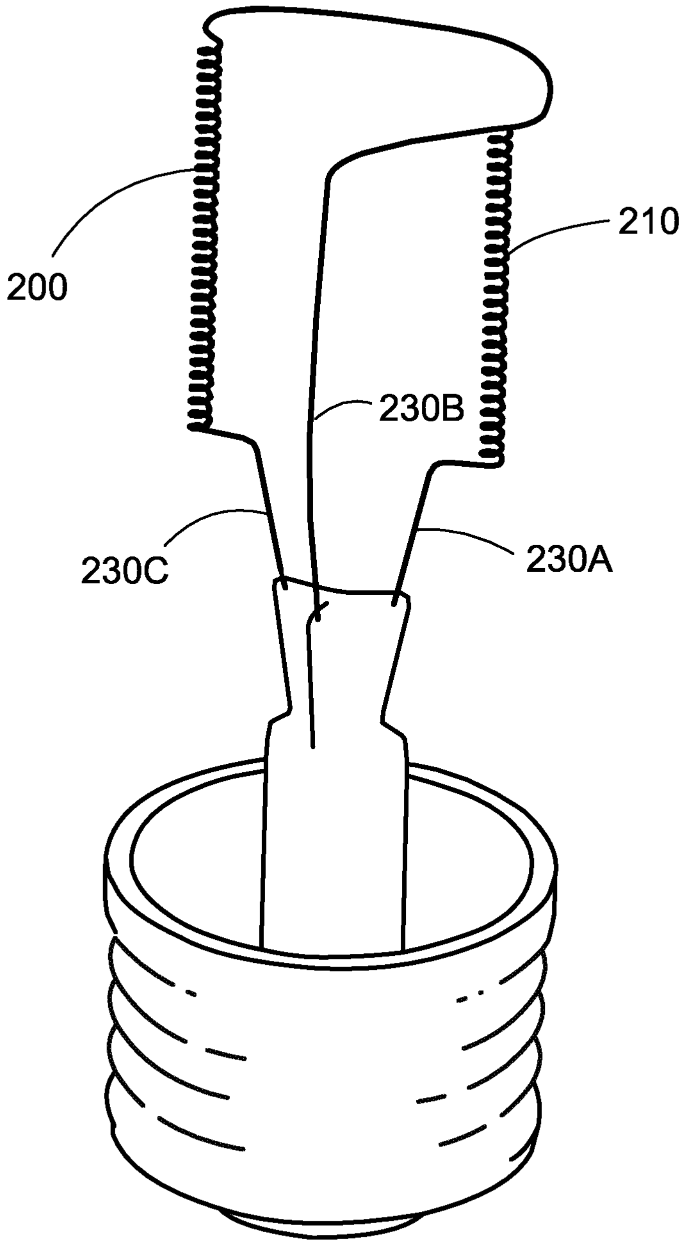
FIG. 2 PRIOR ART
FIG. 2 illustrates the three-way bulb of FIG. 1 with the glass cover removed.
Figure 3:
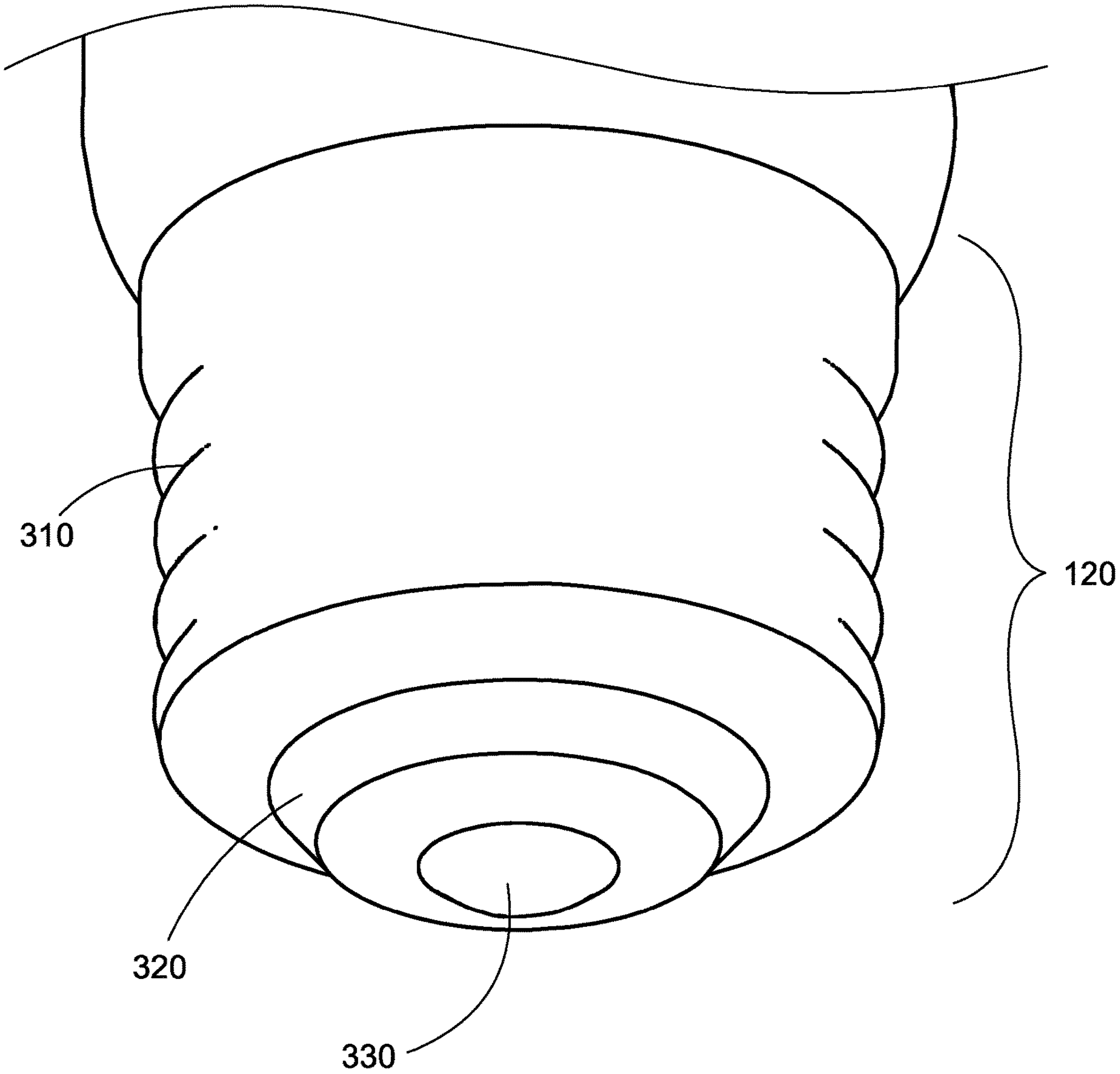
FIG. 3 PRIOR ART
FIG. 3 illustrates further detail of a base of a three-way bulb.

Base 610 includes three electrical contacts: an Outer Contact 630, a Mid-Contact 640 and a Center Contact 650. Outer Contact 630, Mid-Contact 640 and Center Contact 650 are disposed to make electrical contact with a legacy three-way receptacle such that Multi-Mode Bulb 600 may be controlled by a legacy three-way switch. In some embodiments, Outer Contact 630, Mid-Contact 640 and Center Contact 650 are configured similar to those prior art contacts shown in FIG. 3. Outer Contact 630, Mid-Contact 640 and Center Contact 650 are typically configured to receive AC (alternating current) power.

Light Source 620 is a source of light including at least one LED (light emitting diode). In some embodiments Light Source 620 is configured to generate two or more different colors of light responsive to power applied to Outer Contact 630, Mid-Contact 640 and/or Center Contact 650. In some embodiments Light Source 620 is configured to generate two or more different intensities of light responsive to power applied to Outer Contact 630, Mid-Contact 640 and/or Center Contact 650. In some embodiments Light Source 620 is configured to generate two or more different colors of light and two or more different intensities of light responsive to power applied to Outer Contact 630, Mid-Contact 640 and/or Center Contact 650. In some embodiments Light Source 640 includes a laser diode.

In some embodiments, Light Source 620 includes at least three Leads 660A-660C electronically coupled, optionally through one or more Electronic Elements 670A-670C, to Mid-Contact 640, Outer Contact 630 and Center Contact 650, respectively. Electronic Elements 670A-670C are described elsewhere herein.

In various alternative embodiments, Light Source 620 may include a variety of alternative LED configurations configured to produce a net light output. An illustrative subset of these alternative LED configurations is shown in FIGS. 7A-7I.

Figure 7C:
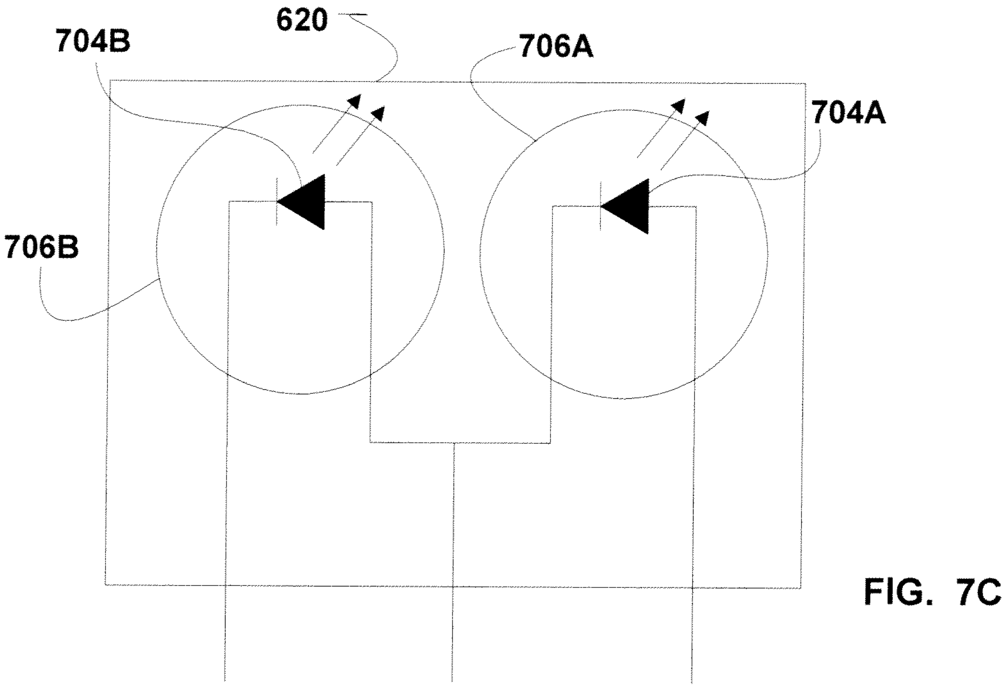
FIGS. 7C and 7D illustrate embodiments of a light source including two separate LEDs.
Figure 7A:
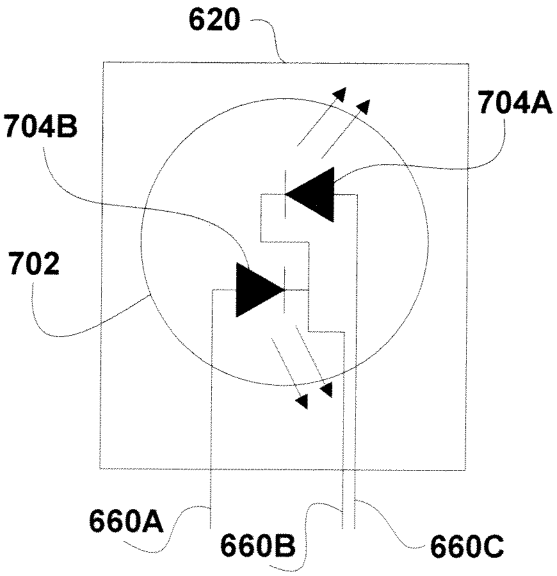
FIG. 7A illustrates an embodiment of a light source including a single LED.

FIG. 7A illustrates an embodiment of Light Source 620 including a single LED 702. LED 702 includes at least Leads 660A-660C and two Light Emitting Junctions 704A-704B. When a voltage of proper polarity is applied across either of Light Emitting Junctions 704A-704B light is generated. For example, if an AC voltage is applied across Leads 660A and 660B, Light Emitting Junction 704B will generate light during one phase of each AC cycle. If the AC voltage has a frequency of 60 Hz then Light Emitting Junction 704B will generate light at 60 Hz with approximately a 50% duty cycle. Light Emitting Junction 704A will likewise respond to an AC voltage applied across Leads 660B and 660C.

In some embodiments Light Emitting junction 704A and 704B are configured to generate light of different color (e.g., different wavelengths). In these embodiments, Light Source 620 will generate light of a first color when a voltage is applied across Leads 660A-660B, a second color when voltage is applied across Leads 660B-660C, and a third color when voltage is applied across both Leads 660A-660B and Leads 660B-660C. The third color will be a combination of the first color and the second color, following color combinations well know in the art (e.g., Red combined with Green gives Yellow). Thus, when Multi-Mode Bulb 600 is screwed into a legacy three-way light socket, a first setting of the legacy three-way switch will result in multi-Mode Bulb 600 generating light of the first color, a second setting of the legacy three-way switch will result in Multi-Mode Bulb 600 generating light of the second color, and a third setting of the legacy three-way switch will result in Multi-Mode Bulb 600 generating light of the third color. In some embodiments the first color is Red, the second color is Green and the third color is Yellow. In some embodiments the first color is Red, the second color is Blue and the third color is Purple.

In some embodiments Light Emitting junction 704A and 704B are configured to generate light of different intensity. In these embodiments, Light Source 620 will generate a net light output of a first intensity when a voltage is applied across Leads 660A-660B, a second intensity when voltage is applied across Leads 660B-660C, and a third intensity when voltage is applied across both Leads 660A-660B and Leads 660B-660C. The third intensity will be approximately a sum of the first intensity and the second intensity. Thus, when Multi-Mode Bulb 600 is screwed into a legacy three-way light socket, a first setting of the legacy three-way switch will result in Multi-Mode Bulb 600 generating a net light output of the first intensity, a second setting of the legacy three-way switch will result in Multi-Mode Bulb 600 generating a net light output of the second intensity, and a third setting of the legacy three-way switch will result in Multi-Mode Bulb 600 generating a net light output of the third intensity. In some embodiments the first intensity is approximately 50% of the second intensity, and the third intensity is approximately three times the first intensity.

In some embodiments, Light Emitting Junctions 704A and 704B are configured to generate light of both different intensity and different color. In these embodiments settings of the legacy three-way switch will result in both three levels of intensity and three different colors.

In FIG. 7A Light Emitting Junctions 704A-704B are shown in a common cathode configuration. In an alternative embodiment (not shown) Light Emitting junctions 707A-707B are in a common anode configuration.

Figure 7B:
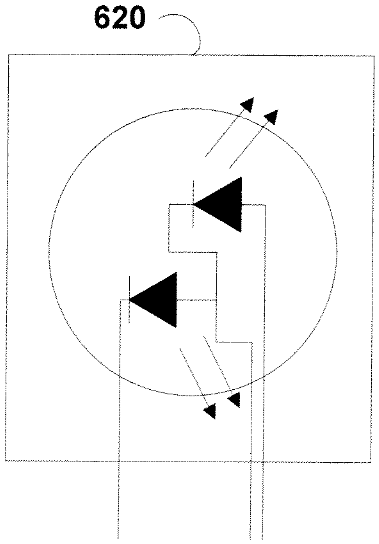
FIG. 7B illustrates an alternative embodiment in which light emitting junctions do not share a common cathode or common anode.

In some embodiments, Lead 660B is electronically coupled to Outer Contact 630 of FIGS. 6A and 6B, and in-phase AC potentials are applied to Leads 660A and 660C. In these embodiments, Light Emitting Junctions 704A and 704B will generate light in-phase. In an alternative embodiment Light Emitting Junctions 704A-704B do not share a common cathode or common anode. This configuration is illustrated in FIG. 7B. In this configuration, light generated by Light Emitting Junctions 704A-704B will be out of phase (assuming the above input). Typically, at 60 Hz, the difference between light generated using the configurations of FIGS. 7A and 7B is not perceivable to the human eye.

Figure 7D:
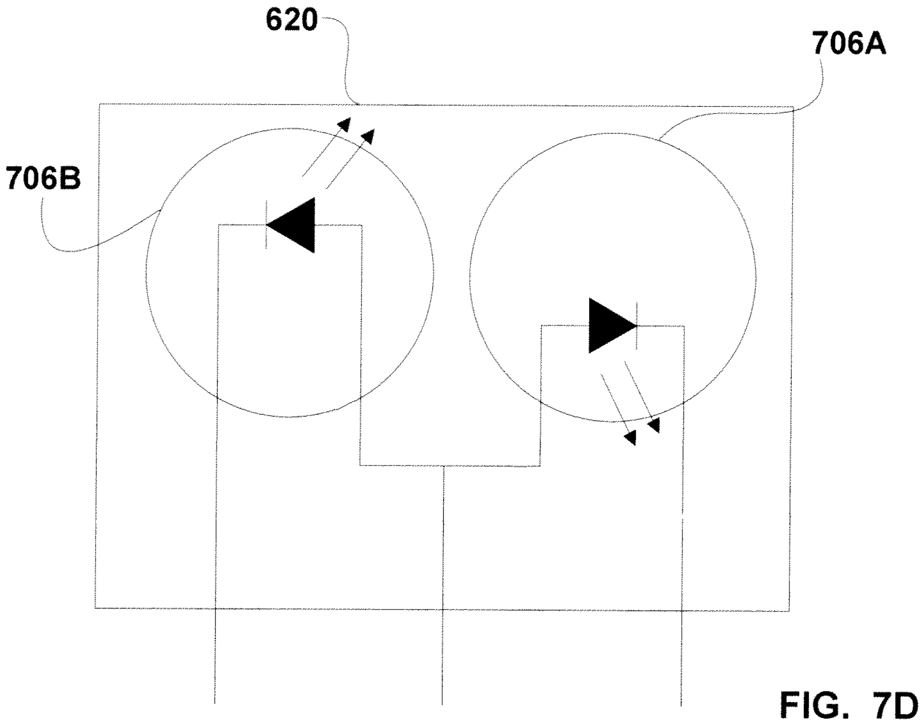

FIGS. 7C and 7D illustrate embodiments of Light Source 620 including two separate LEDs 706A-706B. In these embodiments Light Emitting Junctions 704A and 704B are disposed in separate LEDs 706A-706B. However, by configuring LEDs 706A and 706B as shown in FIGS. 7C and 7D. Light Source 602 can operate in a manner similar to those embodiments discussed above with respect to FIGS. 7A and 7B.

FIG. 7D illustrates an embodiment of Light Source 620 including LEDs 706A and 706B in a common anode configuration. In alternative embodiments (not shown) these LED may be in a common cathode configuration.

Figure 7E:
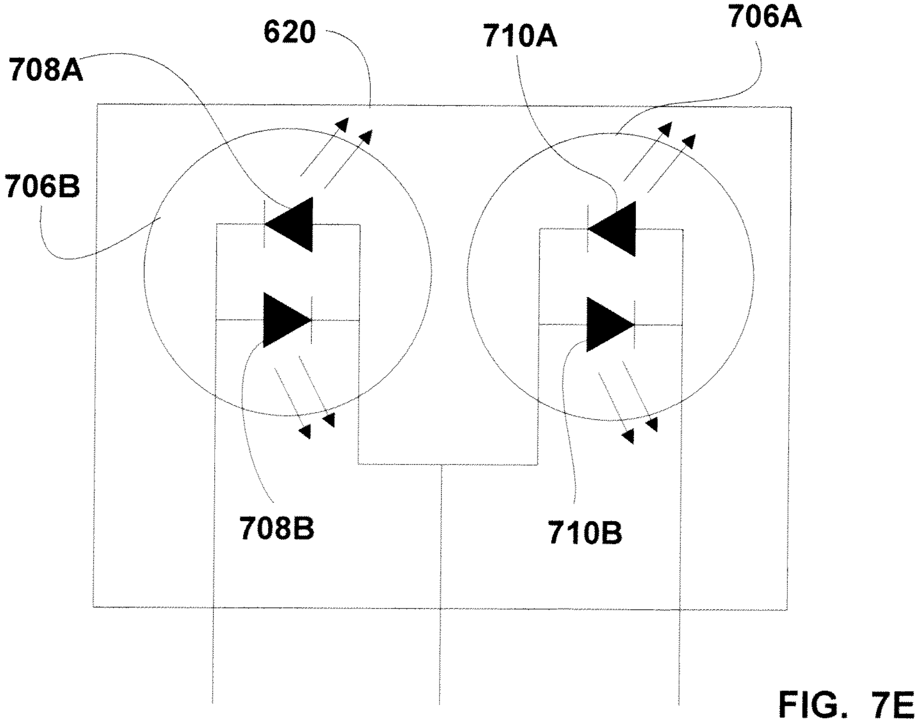
FIG. 7E illustrates an embodiment of a light source in which an LED includes two light emitting junctions, according to various embodiments of the invention.

FIG. 7E illustrates an embodiment of Light Source 620 in which LED 706A includes two Light Emitting Junctions 708A and 708B and LED 706B includes two Light Emitting Junctions 710A and 710B. By including two Light Emitting Junctions in an LED, the LED may be configured to generate light regardless of the polarity of input voltages. Thus, the LED may generate light on both phases of an AC signal. Otherwise, the embodiments of Light Source 620 illustrated in FIG. 7E may function similarly to those embodiments discussed above with respect to FIGS. 7A-7D.

Figure 7F:
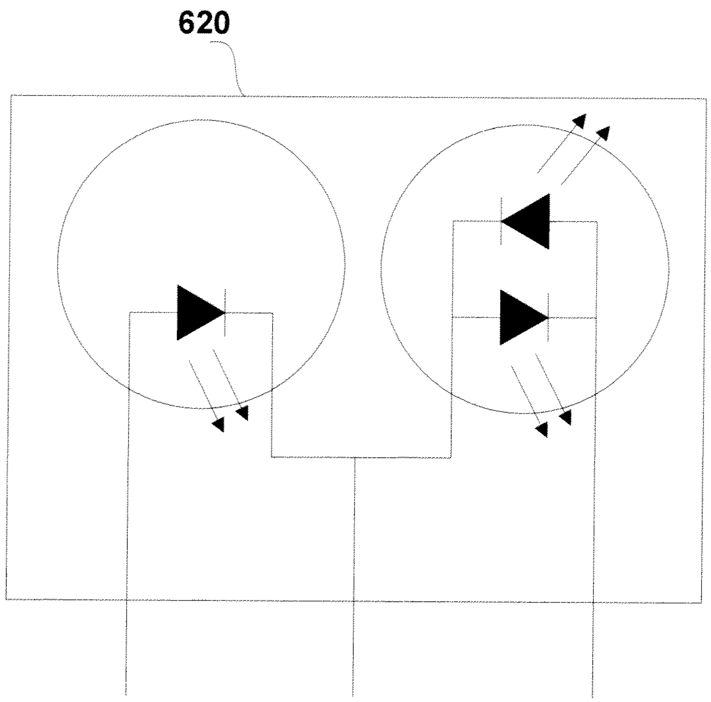
FIG. 7F illustrates an alternative embodiment of a light source.

FIG. 7F illustrates embodiments of Light Source 620 in which LED 706A includes two light emitting junctions and LED 706B includes one light emitting junctions. In some embodiments, this configuration may be used such that LED 706A generates more light than LED 706B. Otherwise, the embodiments of Light Source 620 illustrated in FIG. 7F may function similarly to those embodiments discussed with respect to FIGS. 7A-7E.

Figure 7G:
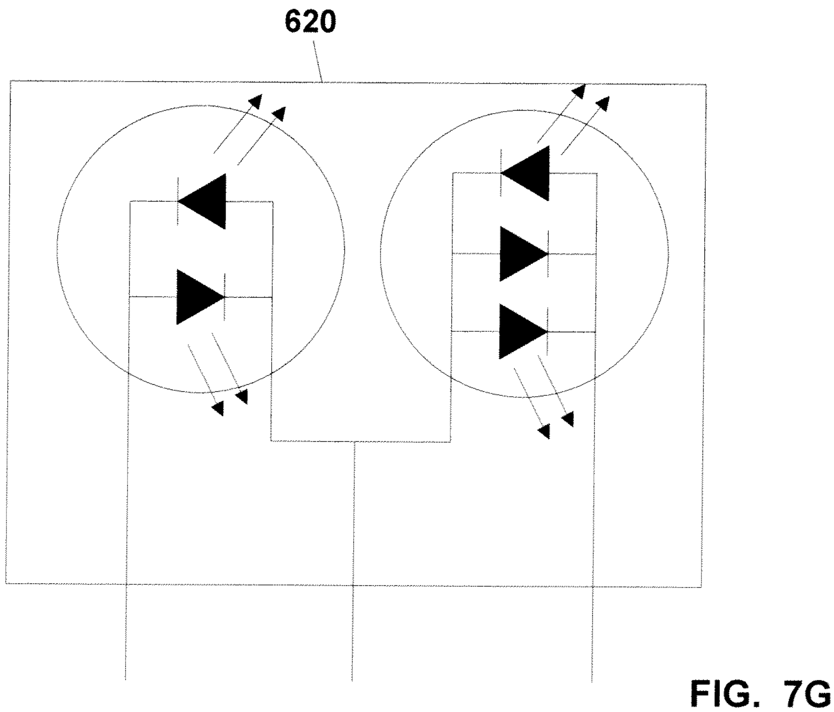
FIGS. 7G and 7H illustrate embodiments of a light source wherein an LED includes three light emitting junctions.
Figure 7H:
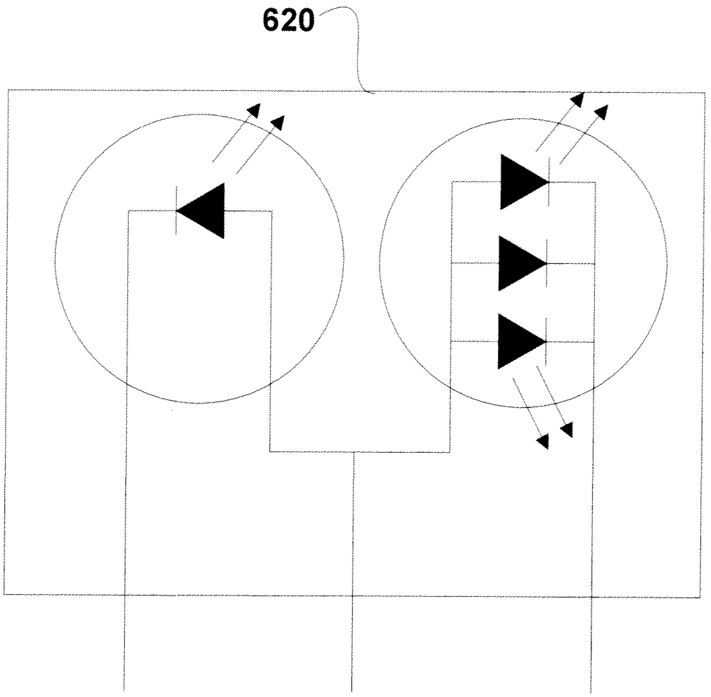

FIGS. 7G and 7H illustrate embodiments of Light Source 620 wherein LED 706A includes three light emitting junctions. These three light emitting junctions may be in various combinations of polarity (e.g., common cathode, common anode, or a mixture thereof). These three light emitting junctions are optionally configured such that their net light output is white or off-white. Thus, if for example LED 706A is configured to generate white light and LED 706B is configured to generate red light, then Multi-Mode Bulb 600 will generate white, red and rose (white+red) net light output responsive to settings of a legacy three-way switch. In another example, if LED 706A is configured to generate white light and LED 706B is configured to generate yellow net light output, then Multi-Mode Bulb 600 will generate white, yellow and a yellowish-white light responsive to settings of a legacy three-way switch. Otherwise, the embodiments of Light Source 620 illustrated in FIG. 7G may function similarly to those embodiments discussed with respect to FIGS. 7A-7F.

Figure 7I:
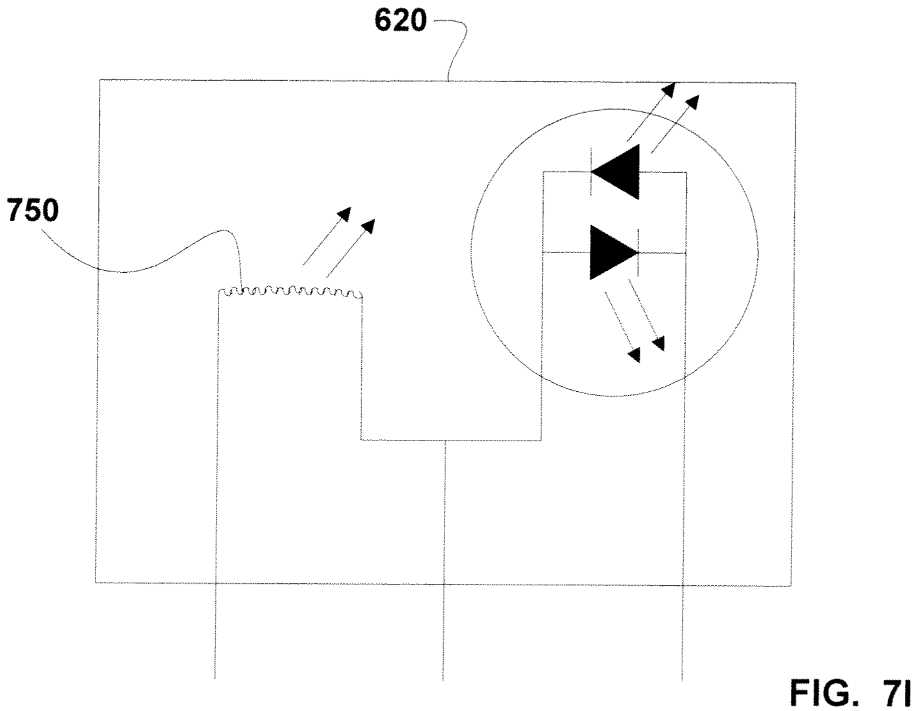
FIG. 7I illustrates embodiments of a light source that include both a conventional light generating filament and an LED.

FIG. 7I illustrates embodiments of Light Source 620 that include both a conventional light generating Filament 750 and an LED 706A. In these embodiments, Filament 750 produces the yellowish-white light normally associated with conventional light bulbs. LED 706A is optionally used to add a color to the white light generated by Filament 750, or to compensate for the yellowness of the light generated by Filament 750 in order to generate a whiter light than that produced by Filament 750 alone. Otherwise, the embodiments of Light Source 620 illustrated in FIG. 7I may function similarly to those embodiments discussed with respect to FIGS. 7A-7H. It is further anticipated that the embodiments of Light Source 620 illustrated in FIG. 7I may be included in two-way bulbs (having just an on and an off state), as well as three-way bulbs. Thus, these embodiments may include only two of Leads 660A-660C. In some embodiments, Filament 750 is replaced by a fluorescent light source.

In some embodiments the various LEDs illustrated in FIGS. 7C-7I are removable from Light Source 620. Thus, an end user may change the lighting characteristics of an instance of Light Source 620 and Multi-Mode Bulb 600 by replacing one LED with another LED having different lighting characteristics. For example, a light color and/or light intensity of Multi-Mode Bulb 600 may be changed by replacing an LED. In these embodiments the replaceable LEDs may connect to Light Sources 620 using a plug or any of the many known methods of connecting an LED in removable fashion to a circuit.

In some embodiments Light Source 620 is removable from Multi-Mode Bulb 600. Thus, an end user may change the lighting characteristics of Multi-Mode Bulb 600 by replacing one embodiment of Light Source 620 with another embodiment of Light Source 620.

Referring again to FIGS. 6A and 6B, various embodiments of Multi-Mode Bulb 600 optionally include Electronic Elements 670A, 670B, and/or 670C disposed within Base 610 and/or Light Source 620. Electronic Elements 670A-670C may include current limiting resistors, AC/DC converters, diodes, filters, digital signal processors, timers, or the like. For example, in one embodiment Electronic Element 670B is a resistor configured to limit the total current passing through Light Source 620 while Electronic Elements 670A and 670C are different resistors configured to limit the current through different LEDs. In another example Electronic Elements 670A-670C are embodied in a pulse generator configured to send different pulse sequences to different LEDs within Light Source 620. In embodiments wherein Electronic Elements 670A-670C are passive elements such as current limiting resistors, Multi-Mode Bulb 600 is compatible with lamps plugged into power sources including a dimmer switch. Electronic Elements 670A-670C are optionally configured such that different intensities of light are generated by different light emitting junctions within the LEDs illustrated in FIGS. 7A-7I.

Referring again to FIGS. 6A and 6B, Multi-Mode Bulb 600 optionally further includes a Support 680 and/or a Bulb Cover 690. Support 680 is configured to hold Light Source 620 relative to Base 610. In some embodiments Support 680 is configured to such that Light Source 620 is removable. In some embodiments Support 680 is configured to facilitate attachment of Bulb Cover 690. For example, in some embodiments, clips or threads on an Outer Surface 682 of Support 680 are disposed to match clips or threads on an Inner Surface 684 of Bulb Cover 690.

Bulb Cover 690 is optionally in the shape of a standard prior art light bulb, as shown in FIG. 6B. In various embodiments, Bulb Cover 690 is made of Glass or a non-glass material such as a polymer, plastic, cloth, polycarbonate, polyvinyl chloride, or the like. In some embodiments, Bulb Cover 690 is made of a non-breakable material. In some embodiments, connections between Bulb Cover 690 and Light Source 620, and/or between Bulb Cover 690 and Base 610 is a non-vacuum tight connection. Thus, the interior of Bulb Cover is optionally at or near atmospheric pressure.

Figure 8A:
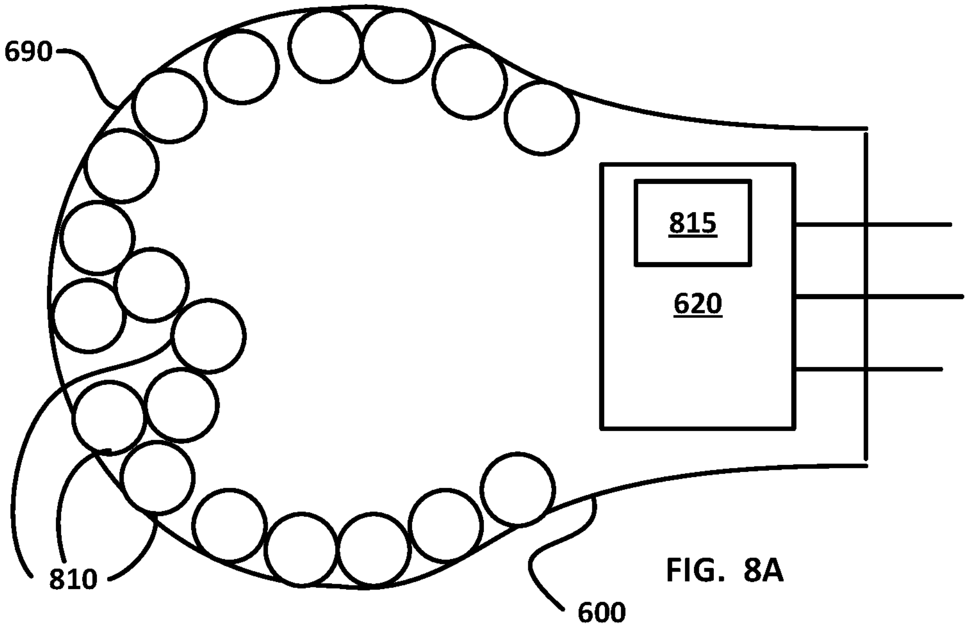
FIGS. 8A and 8B illustrate embodiments in which a bulb cover includes fillers configured to scatter or otherwise alter light generated by a light source.
Figure 8B:
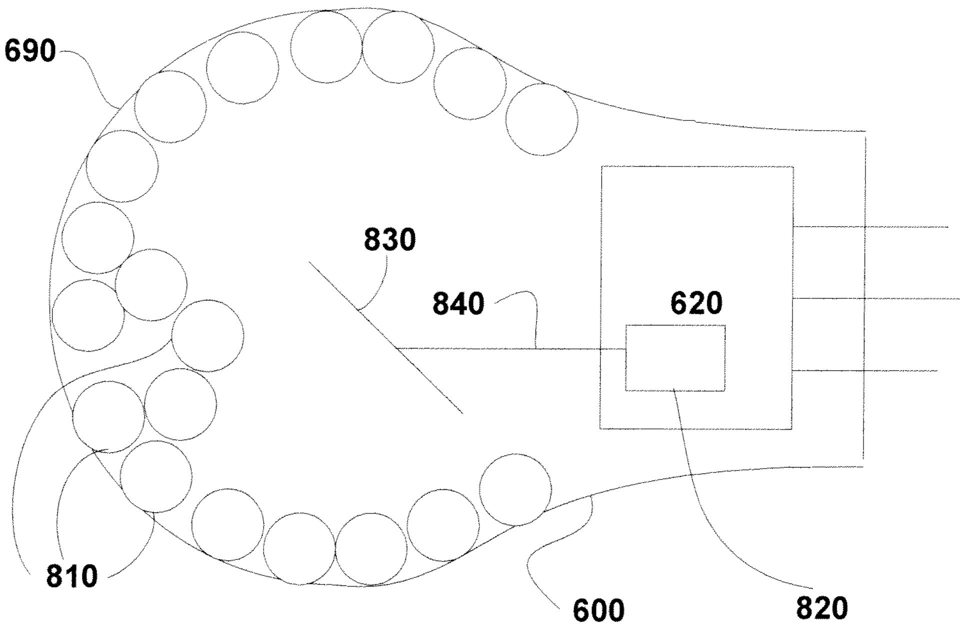

FIGS. 8A and 8B illustrate embodiments in which Bulb Cover 690 includes Fillers 810 configured to scatter or otherwise alter light generated by Light Source 620. For example, Fillers may be colored in order to alter the color of light emitted by Multi-Mode Bulb 600. Fillers 810 of various colors may be distributed throughout Bulb Cover 690 such that different colors are emitted from different regions of Multi-Mode Bulb 600. In some embodiments, liquid may be disposed within Bulb Cover 690. In some embodiments, Fillers 810 include nanoparticles having optical properties particular to their size. In some embodiments two immiscible liquids may be disposed within Bulb Cover 690 in order to generate a Lava Lamp effect within Multi-Mode Bulb 600. In some embodiments Light Source 620 includes a Heat Source and/or Pump 815 configured to generate movement of these two immiscible liquids. The Heat Source and/or Pump 815 is optionally configured to be active one responsive to leads 706A-706C such that it is responsive to a legacy three-way switch. In some embodiments Light Source 620 includes a Motor 820 configured to move one or more Filler 810 within Multi-Mode Bulb 690. For example, this motor may be configured to move an object 830 (via mechanical connection 840) such as a reflective surface or decorative object included as part of Filler 810. This Motor 820 may be configured to move an object 830 within Bulb Cover 690 configured to generate a shadow on Bulb Cover 690 or external to Bulb Cover 690. Motor 820 is optionally configured to move all or part of Light Source 620. For example, in one embodiment Light Source 620 includes a laser, e.g., a laser diode, and Motor 820 is configured to move this laser so as to change the orientation of a laser beam originating from the laser. Motor 820 is optionally configured to move this laser to form an image using the laser beam. Motor 820 is optionally responsive to Leads 706A-706C and thus responsive to a legacy three-way switch. In one embodiment, leads 706A-706C are configure such that a first setting of the three-way switch results in generation of light from Light Source 620 or a filament, a second setting of the three-way switch results in activation of Motor 820, and a third setting of the three-way switch results in both generation of light from Light Source 620 (or a filament) and activation of Motor 820. In some embodiments, Object 830 is configured to look like a flame when moved by Motor 820. In some embodiments Object 830 includes a fan.

Further examples of fillers that may be adapted to embodiments of the invention may be found in U.S. Pat. No. 4,675,575 to Smith et al.

Figure 9:
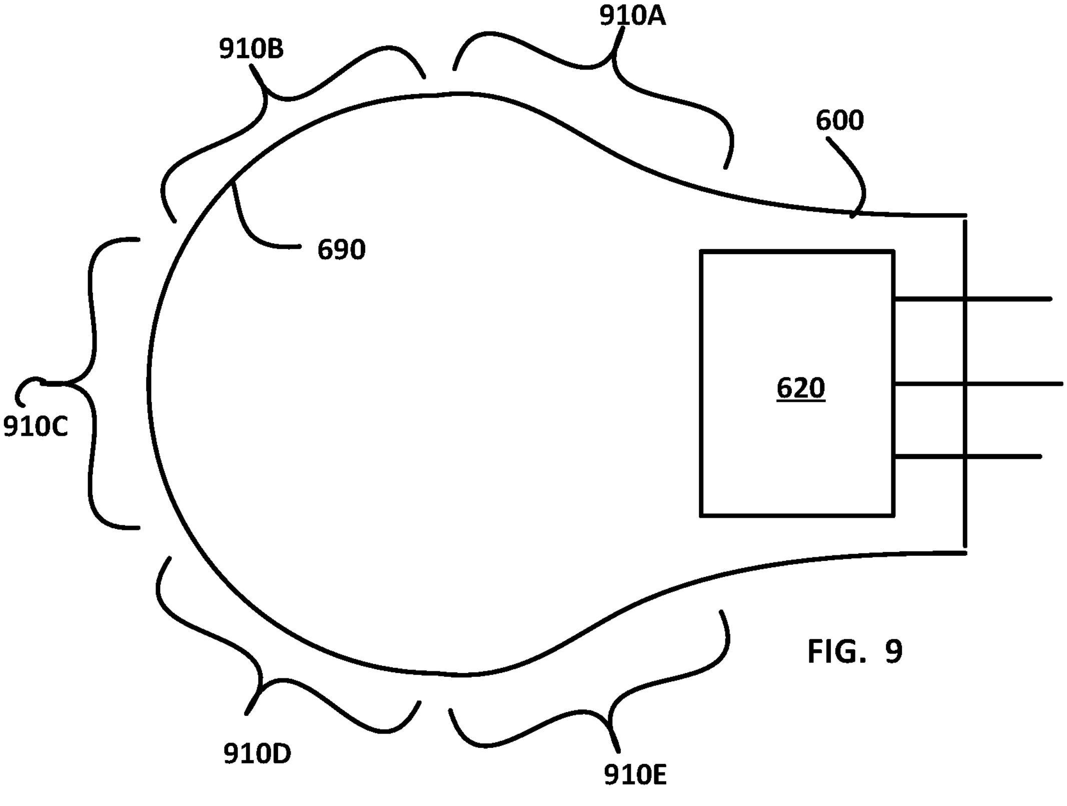
FIG. 9 illustrates embodiments of a bulb cover that includes regions with differing optical properties.

FIG. 9 illustrates embodiments of Bulb Cover 690 that includes Regions 910A-910E with differing optical properties. In various embodiments the number, size, and position of Regions 910A-910E may vary. Regions 910A-910E may differ in their color, light transmission, material, images, or the like. For example, Regions 910A and 910E may be configured to pass light with a yellow color while Regions 910 may be configured to pass white light. As a result one embodiment of Multi-Mode Bulb 600 is configured to direct strong white light up toward a lamp shade or ceiling (assuming a vertical orientation or Multi-Mode Bulb 600) and to direct softer more yellow light down and to the side. Members of Regions 910A-910E may include decorative images and/or masks configured to generate shadows. Because Bulb Cover 690 is optionally made of non-glass materials variations in light transmission, color, and other optical properties are easier to employ than with glass embodiments of Bulb Cover 690. For example, a plastic with a color gradient or an opening in Region 910 is much easier to manufacture that the equivalent in glass.

Figure 10:
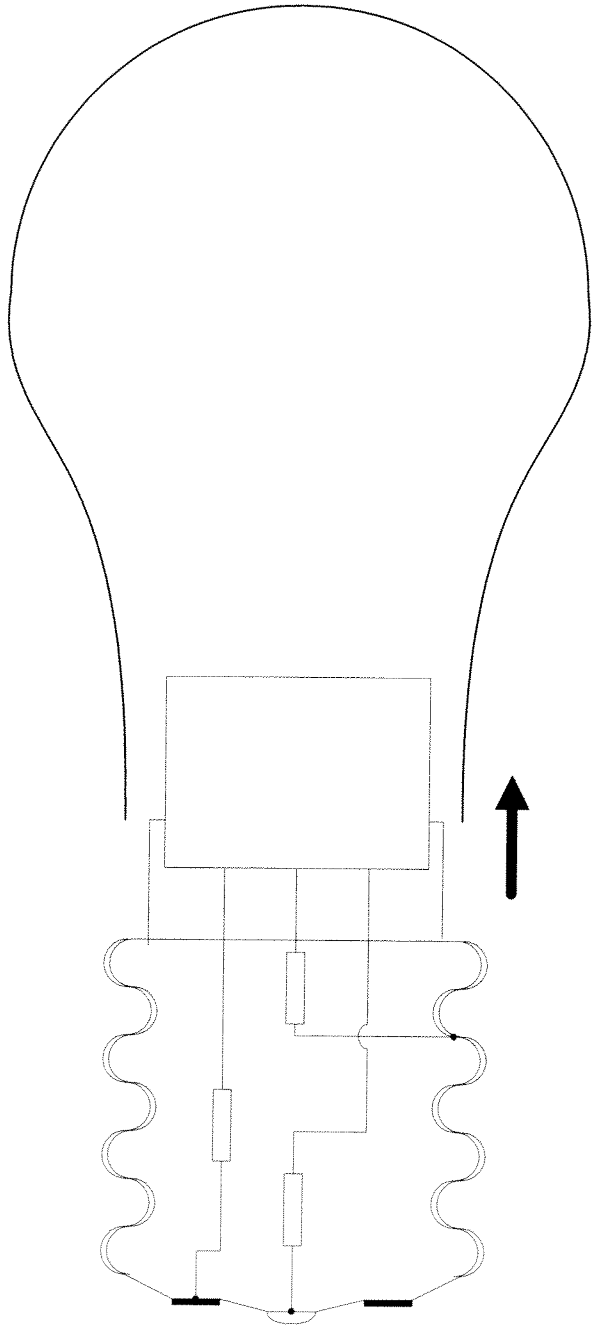
FIG. 10 illustrates embodiments of a multi-mode bulb in which a bulb cover is removable.

FIG. 10 illustrates embodiments of Multi-Mode Bulb 600 in which Bulb Cover 690 is removable and optionally replaceable with alternative embodiments of Bulb Cover 690. Bulb Cover 690 may be attached to Light Source 620, Support 680 and/or Base 610 via a mechanism configured for an end user to detach and reattach. The alternative embodiments of Bulb Cover 690 may have different a different shape than the embodiment of Bulb Cover 690 illustrated in FIGS. 6 and 10.

Figure 11:
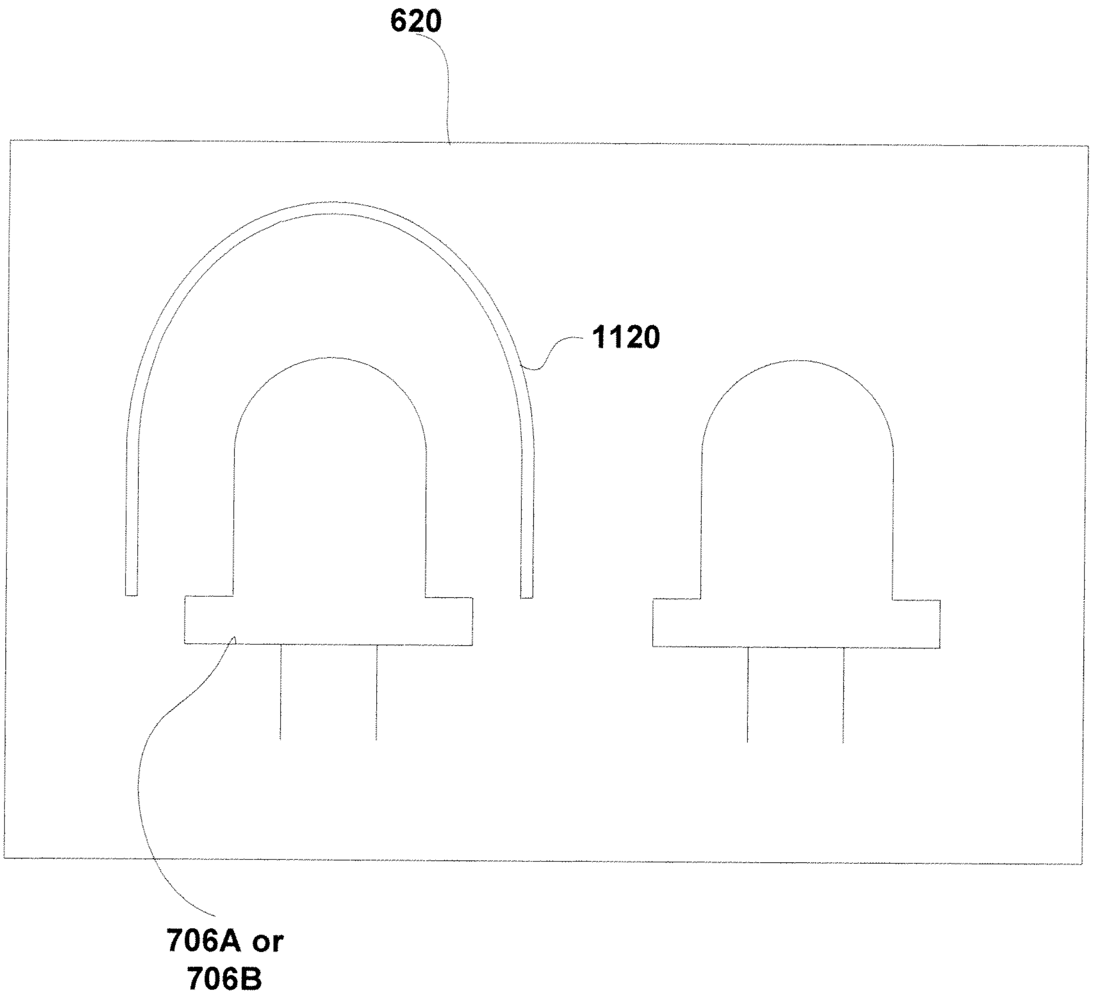
FIG. 11 illustrates embodiments of a light source including an LED configured to be covered by a cover.

FIG. 11 illustrates embodiments of Light Source 620 including an LED configured to be covered by a Cover 1120. Cover 1120 is optionally of various colors and replacement of Cover 1120 therefore allows for end user modification of light generated by powering the LED.

Figure 12:
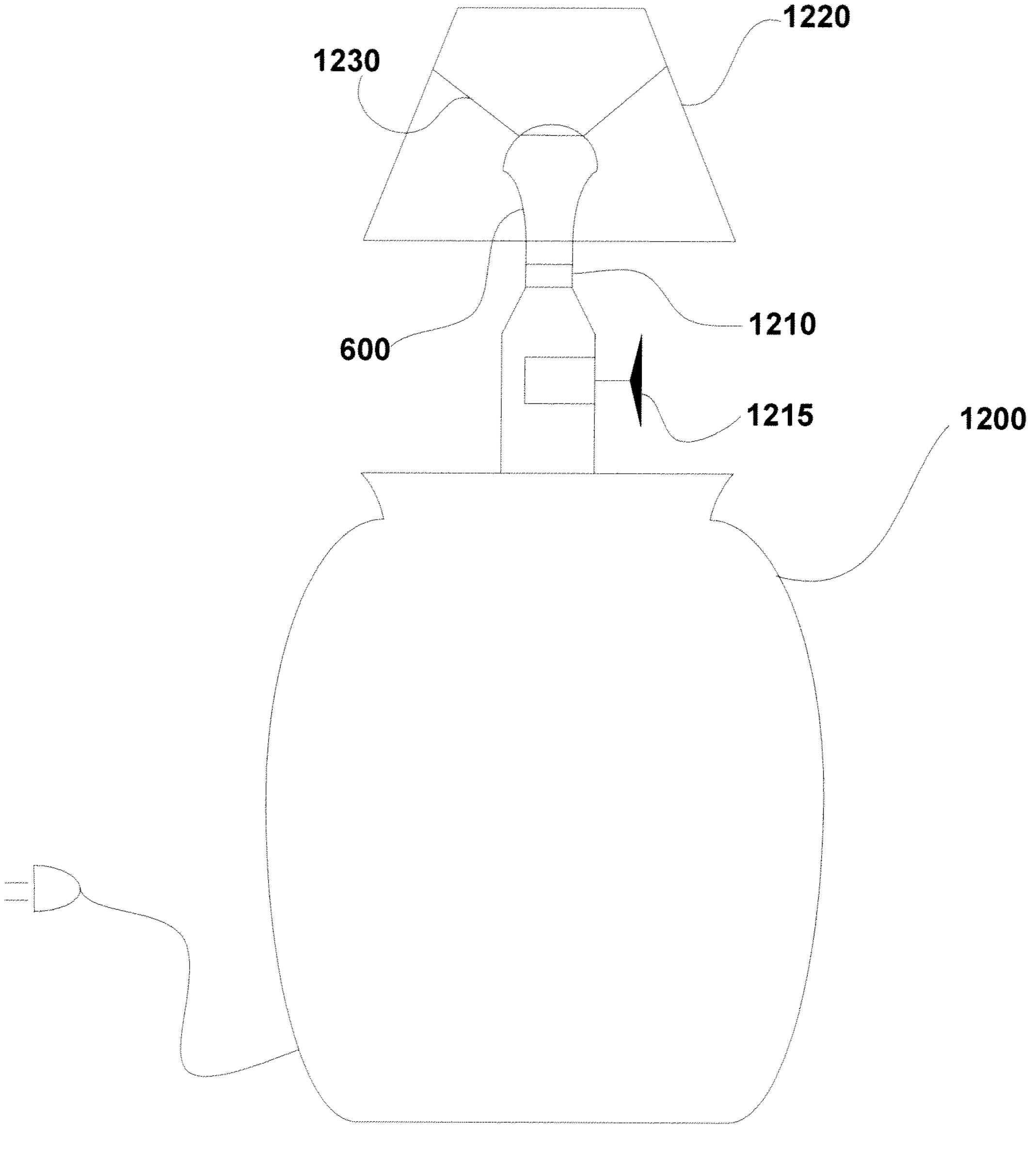
FIG. 12 illustrates a three-way lamp, according to various embodiments of the invention.

FIG. 12 illustrates a Three-Way Lamp 1200 including a legacy three-way switch 1215, a legacy three-way socket 1210, and Multi-Mode Bulb 600. Multi-Mode Bulb 600 is configured to support a Lamp Shade 1220. For example, in some embodiments, Lamp Shade 1220 is supported by Supports 1230 which are optionally wire, plastic, wood, or other material sufficient to provide mechanical stability. Because the LEDs of Multi-Mode Bulb 600 do not generate significant heat, Supports 1230 may be of a material, such as wood or plastic that would not tolerate the heat of a conventional light bulb. Supports 1230 optionally come into direct compact with Cover 690 of Multi-Mode Bulb 600. In some embodiments Cover 690 is shaped similar to a prior art filament based light bulb in order to accommodate legacy lamp shades having wire loops for Supports 1230. In some embodiments, Supports 1230 are permanently or semi-permanently attached to Cover 690.

Figure 13:
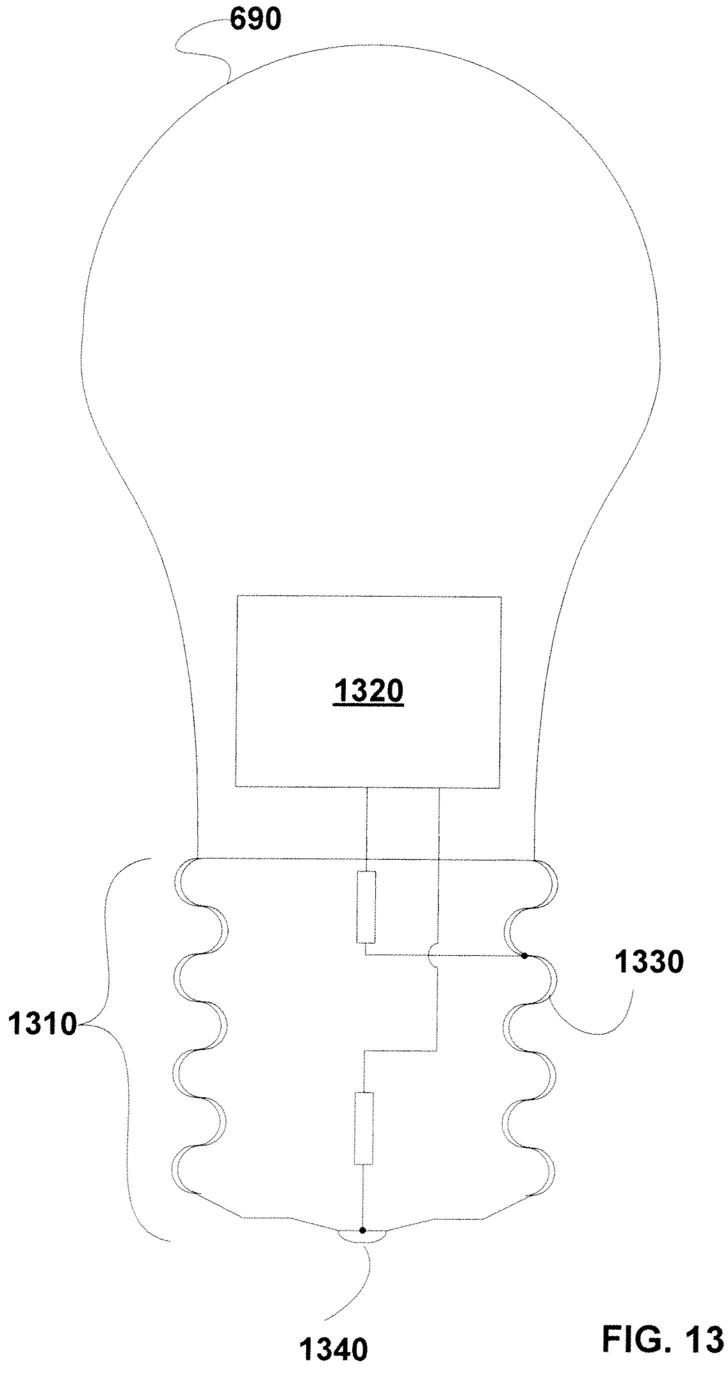
FIG. 13 illustrates an alternative embodiment of a three-way bulb, according to various embodiments of the invention.

While the discussion herein is primarily directed at Multi-Mode Bulb 600, many of the features discussed herein alternatively apply to an LED Bulb 1300 illustrated in FIG. 13. LED Bulb 1300 includes Cover 690, a Base 1310 and a Light Source 1320. Base 1310 includes two electrical contacts, such as an Outer Contact 1330 and a Contact 1340. Base 1310 is configured as a screw mount, bayonet mount, or the like. In some embodiments Light Source 1320 includes an instance of Light Source 620 without one of Leads 706A-706C. Those features of the invention discussed elsewhere herein that do not depend on having all three of Outer Contact 630, Mid-Contact 640 and Center Contact 650 may be included in LED Bulb 1300. These features include, but are not limited to, those discussed herein in reference to FIG. 7I, FIGS. 8A and 8B, FIG. 9, FIG. 10, FIG. 11 and FIG. 12. (For example, the filament/LED combination of FIG. 7I, the fillers of FIGS. 8A and 8B, the motor of FIG. 8B, the regions of FIG. 9, the removable cover and cover material of FIG. 10, the LED covers of FIG. 11, and/or the lamp shade/cover material of FIG. 12, may be included in LED Bulb 1300.)

Several embodiments are specifically illustrated and/or described herein. However, it will be appreciated that modifications and variations are covered by the above teachings and within the scope of the appended claims without departing from the spirit and intended scope thereof. For example the LEDs discussed herein may include diode based lasers. Further, it is expected that embodiments of the invention will be adapted to new types of lamps, rather than merely legacy three-way and two-way lamps.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

I claim:

1. A bulb comprising:

a base of the bulb;

a light source of the bulb, the light source being supported by the base and including one or more light emitting junctions;

a digital signal processor disposed within the bulb and electrically coupled to the light source; and a bulb cover configured to cover the light source.

2. The bulb of claim 1, wherein the bulb cover comprises primarily a non-glass material.

3. The bulb of claim 1, wherein the bulb cover comprises a polymer or plastic material.

4. The bulb of claim 3, wherein the bulb cover includes a shape of a standard prior art light bulb as illustrated in FIG. 6B.

5. The bulb of claim 1, further comprising an AC/DC converter disposed within the bulb and electronically coupled to the light source.

6. The bulb of claim 5, wherein the AC/DC converter is configured to generate different intensities of light using the light emitting junctions.

7. The bulb of claim 1, further comprising a pulse generator configured to receive electrical power from the base and to generate pulse sequences to power the light source.

8. The bulb of claim 7, wherein the pulse generator is configured to send different pulse sequences to the light emitting junctions and electronic elements of the pulse generator are electrically connected to different electrical contacts of the base.

9. The bulb of claim 1, wherein an interior of the bulb cover is at or near atmospheric pressure.

10. The bulb of claim 1, further including a timer disposed within the bulb.

11. The bulb of claim 1, further comprising nanoparticles disposed within the bulb, the nanoparticles having optical properties particular to their size.

12. The bulb of claim 1, wherein the light source is configured to generate more than one color of light responsive to the digital signal processor.

13. The bulb of claim 1, wherein the light source is configured to generate different intensities of light responsive to the digital signal processor.

14. The bulb of claim 1, wherein the digital signal processor is configured to generate different intensities of light using the light emitting junctions.

15. The bulb of claim 1, wherein the light emitting junctions are disposed within a plurality of light emitting diodes.

16. The bulb of claim 1, further comprising a light generating filament disposed within the bulb and configured to be powered via the base.

17. The bulb of claim 1, wherein the base is a 3-way base.

18. A bulb comprising:

a base of the bulb;

a light source of the bulb, the light source being supported by the base and including one or more light emitting junctions;

a timer disposed within the bulb and electrically coupled to the light source; and a bulb cover configured to cover the light source.

19. The bulb of claim 18, wherein the bulb cover comprises a plastic or polymer.

20. The bulb of claim 18, further comprising a pulse generator configured to receive electrical power from the base and to generate pulse sequences to power the light source.

* * * * *